US006887926B1

(12) United States Patent
Parhar et al.

(10) Patent No.: US 6,887,926 B1
(45) Date of Patent: May 3, 2005

(54) BONDING COMPOSITIONS FOR CHLORINATED POLYMERS AND METHODS OF USING THE SAME

(75) Inventors: Amrit K. Parhar, North Ridgeville, OH (US); Charles N. Bush, Bay Village, OH (US)

(73) Assignee: Oatey Co., Cleveland, OH (US)

( * ) Notice: Subject to any disclaimer, the term of this patent is extended or adjusted under 35 U.S.C. 154(b) by 228 days.

(21) Appl. No.: 10/295,186

(22) Filed: Nov. 15, 2002

Related U.S. Application Data

(60) Provisional application No. 60/332,815, filed on Nov. 16, 2001.

(51) Int. Cl.$^7$ ............................. C08K 5/526; C08K 3/26
(52) U.S. Cl. ..................... 524/128; 524/130; 524/147; 524/151; 524/153; 524/303; 524/349; 524/350; 524/351; 524/352; 524/353; 524/392; 524/424; 524/425
(58) Field of Search ................................. 524/128, 130, 524/147, 151, 153, 349–353, 392, 424–425

(56) References Cited

U.S. PATENT DOCUMENTS

| | | | |
|---|---|---|---|
| 3,765,983 A | 10/1973 | Putzier | 156/293 |
| 3,811,980 A | 5/1974 | Roderhoff | 156/308 |
| 3,919,168 A | 11/1975 | Dieckmann | 524/180 |
| 3,943,081 A | 3/1976 | Brook | 524/121 |
| 3,998,782 A | 12/1976 | Hutton et al. | 524/117 |
| 4,672,084 A | 6/1987 | Dierdorf et al. | 524/113 |
| 4,675,354 A | 6/1987 | Sperling | 524/99 |
| 4,743,640 A | 5/1988 | Wirth et al. | 524/280 |
| 4,873,231 A | 10/1989 | Smith | 514/557 |
| 4,910,244 A | 3/1990 | Dierdorf et al. | 524/179 |
| 4,937,076 A | 6/1990 | Lapidus | 424/441 |
| 4,975,281 A | 12/1990 | Harwood et al. | 424/441 |
| 5,006,571 A | 4/1991 | Kumar et al. | 523/120 |
| 5,034,416 A | 7/1991 | Smith | 514/568 |
| 5,039,515 A | 8/1991 | Korf | 424/53 |
| 5,100,946 A | 3/1992 | Hung et al. | 524/397 |
| 5,109,046 A | 4/1992 | Larkin et al. | 524/178 |
| 5,143,716 A | 9/1992 | Unger | 424/9 |
| 5,173,287 A | 12/1992 | Smith | 424/10 |
| 5,225,202 A | 7/1993 | Hodges et al. | 424/480 |
| 5,234,693 A | 8/1993 | Garcia et al. | 521/76 |
| 5,241,094 A | 8/1993 | Razvan et al. | 556/179 |
| 5,244,670 A | 9/1993 | Upson et al. | 424/439 |
| 5,252,634 A | 10/1993 | Patel et al. | 523/218 |
| 5,298,545 A | 3/1994 | Razvan et al. | 524/414 |
| 5,312,941 A | 5/1994 | Razvan et al. | 556/179 |
| 5,320,826 A | 6/1994 | Unger | 424/9 |
| 5,356,982 A | 10/1994 | Razvan et al. | 524/414 |
| 5,384,345 A | 1/1995 | Naton | 523/218 |
| 5,416,142 A * | 5/1995 | Bush et al. | 524/113 |
| 5,420,176 A | 5/1995 | Unger et al. | 523/205 |
| 5,449,508 A | 9/1995 | Unger | 424/9.323 |
| 5,470,894 A | 11/1995 | Patel et al. | 523/218 |
| 5,525,326 A | 6/1996 | Unger | 424/9.36 |
| 5,567,439 A | 10/1996 | Myers et al. | 424/486 |
| 5,582,873 A | 12/1996 | Desai | 427/412.4 |
| 5,587,172 A | 12/1996 | Cherukuri et al. | 424/401 |
| 5,587,198 A | 12/1996 | Cherukuri et al. | 426/660 |
| 5,609,892 A | 3/1997 | Garcia et al. | 425/311 |
| 5,611,962 A | 3/1997 | Garcia et al. | 252/350 |
| 5,621,015 A | 4/1997 | Garcia et al. | 521/76 |
| 5,622,719 A | 4/1997 | Myers et al. | 424/488 |
| 5,637,313 A | 6/1997 | Chau et al. | 424/440 |
| 5,639,442 A | 6/1997 | Unger et al. | 424/9.5 |
| 5,654,003 A | 8/1997 | Fuisz et al. | 424/469 |
| 5,683,720 A | 11/1997 | Myers et al. | 424/489 |
| 5,714,528 A | 2/1998 | Unger et al. | 523/205 |
| 5,714,529 A | 2/1998 | Unger et al. | 523/205 |
| 5,728,400 A | 3/1998 | Battist et al. | 424/464 |
| 5,733,577 A | 3/1998 | Myers et al. | 424/488 |
| 5,739,188 A | 4/1998 | Desai | 524/140 |
| 5,741,482 A | 4/1998 | Modi | 424/76.3 |
| 5,762,962 A | 6/1998 | Georgiades et al. | 424/466 |
| 5,766,622 A | 6/1998 | Nelson | 424/440 |
| 5,804,247 A | 9/1998 | Cherukuri et al. | 426/660 |
| 5,821,289 A | 10/1998 | Congelio et al. | 524/104 |
| 5,827,852 A | 10/1998 | Russell et al. | 514/255 |
| 5,840,334 A | 11/1998 | Raiden et al. | 424/464 |
| 5,849,223 A | 12/1998 | Myers et al. | 264/15 |
| 5,851,552 A | 12/1998 | Myers et al. | 424/488 |
| 5,851,553 A | 12/1998 | Myers et al. | 424/488 |
| 5,853,762 A | 12/1998 | Myers et al. | 424/488 |
| 5,866,163 A | 2/1999 | Myers et al. | 424/469 |
| 5,869,098 A | 2/1999 | Misra et al. | 424/484 |
| 5,871,781 A | 2/1999 | Myers et al. | 425/9 |
| 5,880,106 A | 3/1999 | Ullah et al. | 514/45 |
| 5,885,549 A | 3/1999 | Unger | 424/9.36 |
| 5,885,594 A | 3/1999 | Nilsen et al. | 424/401 |
| 5,895,664 A | 4/1999 | Cherukuri et al. | 424/464 |

(Continued)

FOREIGN PATENT DOCUMENTS

WO 017264 3/2000

Primary Examiner—Peter Szekely
(74) Attorney, Agent, or Firm—Renner, Otto, Boisselle & Sklar, LLP

(57) ABSTRACT

A composition, and a method of using the composition, are described which composition comprising: (A) at least one chlorinated polyvinyl chloride or mixture of at least one polyvinyl-chloride and at least one chlorinated polyvinyl-chloride thereof; (B) at least one volatile organic liquid which is a solvent for the polymer of (A); and (C) a stabilizer comprising (i) an organophosphite compound, at least one hindered phenol, at least one of an organotin compound or mixtures thereof, and (ii) at least one metal-containing carbonate salt. The composition and methods of the present invention act to retard the loss of chlorine from the resins of the adhesive compositions and to absorb or otherwise inactive any lost chlorine. The compositions of the invention are useful in a variety of applications including use as adhesives, cements (including solvent cements) glues or pastes for holding together materials by surface attachment, and as sealants which are load-bearing elastic jointing and insulating materials.

10 Claims, No Drawings

U.S. PATENT DOCUMENTS

| | | | |
|---|---|---|---|
| 5,914,135 A | 6/1999 | Dubek et al. | 424/687 |
| 5,935,600 A | 8/1999 | Cherukuri et al. | 424/464 |
| 5,948,387 A | 9/1999 | Unger et al. | 424/9.5 |
| 5,962,560 A | 10/1999 | Congelio et al. | 524/104 |
| 5,965,162 A | 10/1999 | Fuisz et al. | 424/464 |
| 5,965,164 A | 10/1999 | Fuisz et al. | 424/489 |
| 5,969,015 A | 10/1999 | Zinke et al. | 524/109 |
| 6,020,002 A | 2/2000 | Myers et al. | 424/488 |
| 6,024,939 A | 2/2000 | Unger | 424/9.5 |
| 6,024,945 A | 2/2000 | Parekh | 424/68 |
| 6,025,411 A | 2/2000 | Wong et al. | 523/120 |
| 6,048,541 A | 4/2000 | Misra et al. | 424/401 |
| 6,048,552 A | 4/2000 | Swinson et al. | 424/686 |
| 6,075,113 A | 6/2000 | Masterman et al. | 528/176 |
| 6,083,430 A | 7/2000 | Fuisz et al. | 264/5 |
| 6,087,421 A | 7/2000 | Patel et al. | 524/113 |
| 6,110,505 A | 8/2000 | Smith et al. | 424/686 |
| 6,110,506 A | 8/2000 | Swinson et al. | 424/686 |
| 6,126,960 A | 10/2000 | Nilsen et al. | 424/440 |
| 6,156,832 A | 12/2000 | Bertelo et al. | 524/178 |
| 6,197,329 B1 | 3/2001 | Hermelin et al. | 424/441 |
| 6,239,191 B1 | 5/2001 | Wong et al. | 523/120 |
| 6,261,600 B1 | 7/2001 | Kirschner et al. | 424/466 |
| 6,277,406 B1 | 8/2001 | Fuisz et al. | 424/464 |
| 6,284,265 B1 | 9/2001 | Lambert et al. | 424/439 |
| 6,310,125 B1 | 10/2001 | Rayner | 524/195 |
| 6,613,186 B2 * | 9/2003 | Johnson | 156/333 |

* cited by examiner

BONDING COMPOSITIONS FOR CHLORINATED POLYMERS AND METHODS OF USING THE SAME

RELATED APPLICATION

This application claims priority from Provisional Application Ser. No. 60/332,815, filed Nov. 16, 2001. That application is hereby incorporated by reference in its entirety.

TECHNICAL FIELD

This invention relates to compositions which comprise chlorinated polymers in organic solvents. This invention also relates to stabilized adhesive and sealant compositions, and in particular, to stabilized adhesive compositions useful for forming a bond or weld between two polymeric surfaces and methods of using the same.

BACKGROUND OF THE INVENTION

Adhesives, often referred to as cements, glues or pastes are defined generally as substances capable of holding materials together by surface attachment. Adhesives may attach to surfaces and develop the internal or cohesive strength necessary to hold the materials together while cooling from liquid to solid state, while losing solvent, or during a chemical reaction. Many of the substances designated as adhesives may also be designated as caulking, potting, sealing, casting or encapsulating compounds when employed in a thick mass. In a more restrictive sense, to be termed an adhesive, a substance should be a liquid or a tack semi-solid, at least for a short period of time in order to contact and wet a surface, and should be used in a relatively thin layer to form a useful joint capable of transmitting stresses from one substrate to another. Thus, the term "adhesives", as used in this specification and in the claims, includes cements, glues and pastes.

Solvent cementing is a process which thermoplastics, usually amorphous, are softened by the application of a suitable solvent or mixture of solvents, and then pressed together to effect a bond. Many thermoplastic substrate are easier to join effectively by solvent cements than by conventional adhesive bonding. Generally, a small amount of the same resin as that to be cemented is dissolved in a solvent to form the cement. The inclusion of the resin aids in gap filling, accelerates setting, and reduces shrinkage and internal stresses.

Solvents cements also have been utilized to bond different plastic materials to each other, but in such instances, the solvent must be a solvent for both plastics. Usually in such instances, a mixture of solvents is used. The solvent softens (dissolves) the surface of the resin to be bonded, and the surface becomes tacky. At this point, the surfaces are brought into contact with each other, often under pressure, and dried.

For many years, solvent cements have been for joining PVC (polyvinylchloride) and CPVC (chlorinated polyvinylchloride) plastic pipe and fittings. The amount of such plastic pipe used for conveying a variety of liquids is enormous. The major uses are drain, waste, vent sewer and potable water conveyance. Plastic pipe has increasingly displaced the traditional materials used for the same purpose such as copper, steel, galvanized metal, cast iron, lead and concrete asbestos pipe. Plastic pipe has become the material of choice in the home, municipal, and manufacturing industries.

The ASTM standard for PVC solvent cements is ASTM D-2564. According to this standard, such solvent cements contain a minimum of 10% PVC resin, inert fillers, and the remainder is one or more solvents from the group of tetrahydrofuran (THF), cyclohexanone (CYH), MEK, and acetone.

ASTM F-493 sets forth the requirements for CPVC solvent cements as containing a minimum of 10% CPVC resin, inert fillers, and the remainder is one or more solvents including THF, CYH, MEK and/or acetone.

Pipes and fittings of CPVC are used for applications where, in addition to high internal pressures of up to 5 bar, temperatures in the range from ambient to at least about 95° C. are encountered. Known adhesives for pipes and fittings of CPVC contain between 10 and 30% by weight CPVC in combination with suitable solvents, such as tetrahydrofuran, cyclohydrofuran, cyclohexanone, methyl ethyl ketone, N-methylpyrrolidone, methylene chloride, acetone, ethyl acetate and the like. The adhesives may contain consistency-generating constituents such as thickeners, thixotropic agents and the like. Known solvents have added various stabilizers, but have failed to completely resolve the problems resulting from the heat exposure of CPVC. Upon exposure to heat, CPVC both in the piping and structural components, and in the cement bonding together these components, degrades by loss of chlorine.

An additional problem encountered with solvent cements including chlorinated polymers and particularly CPVC, is that, depending on the storage temperature and particularly at elevated storage temperatures, the chlorinated polymer losses chlorine through heat-caused degradative processes. The loss of chlorine from CPVC due to heat degradation results in loss of desirable properties in the CPVC cement.

In addition to the resulting changes in the CPVC itself, due to the inevitable presence of moisture in the solvent cement (for example, as a result of exposure to atmospheric moisture or present as an impurity in the solvent), loss of chlorine can lead to container corrosion through the formation of hydrogen chloride. In order to store adhesives containing CPVC for prolonged periods without any risk of corrosion, the adhesives may be stored in containers made of materials which withstand the chemical attack of hydrogen chloride. However, such containers as glass or polyolefin are unsuitable for other reasons.

Thus, solvent cements for both PVC and CPVC continue to require the addition of stabilizers, particularly against the effects of heat. For the above reasons, this need is particularly acute for CPVC solvent cements since CPVC is specifically designed for use with hot liquids at elevated pressures. Because of the critical function of the cement or adhesives in maintaining the integrity of the piping system subjected to such conditions, there is a continuing need for improved solvent cement systems, particularly with respect to the stabilizers.

SUMMARY OF THE INVENTION

A composition, and a method of using the composition, are described which composition comprising: (A) at least one chlorinated polyvinyl chloride or mixture of at least one polyvinyl-chloride and at least one chlorinated polyvinyl-chloride thereof; (B) at least one volatile organic liquid which is a solvent for the polymer of (A); and (C) a stabilizer comprising (i) at least one organophosphite compound, at least one hindered phenol, or at least one organotin compound, and (ii) at least one metal-containing carbonate salt. The composition and methods of the present invention act to retard the loss of chlorine from the resins in the adhesive compositions and to absorb or otherwise inactivate any lost chlorine. The compositions of the invention are useful in a variety of applications including use as adhesives, cements (including solvent cements) glues or pastes for holding together materials by surface attachment, and as sealants which are load-bearing elastic jointing and insulating materials.

DETAILED DESCRIPTION

In addition to the definitions contained in the Background, the following terms utilized in the present application and claims have the following meanings:

"weld"—to fuse or join two components together through the use of the adhesive compositions of the present invention;

"solvent"—a substance capable of dissolving another substance;

"volatile solvent"—a solvent which evaporates rapidly at room temperature or at a slightly elevated temperature;

"solvent welding"—a process that utilizes solvents to join two surfaces together;

"solvent cement"—an adhesive made by dissolving a plastic resin or compound in a suitable solvent or mixture of solvents. The solvent cement dissolves the surfaces of the pipe and fittings to form a bond between the mating surfaces provided the proper cement is used for the particular materials and proper techniques are followed;

"adhesive (composition)"—includes any liquid coating composition which is capable of forming a bond or a weld between two surfaces;

"primer"—conventionally employed liquid composition which prepares the surface to be bonded for satisfactory adhesive bonding or welding;

"cured"—when most of the solvent applied has evaporated leaving a thermoplastic solvent welded joint fused together so that pressure can be successfully applied;

"DWV"—drain, waste, vent applications.

The compositions of the present invention comprise a mixture of (A) of at least one chlorinated polyvinyl chloride or a mixture of chlorinated polyvinyl chloride and polyvinyl chloride mixtures thereof; (B) at least one volatile organic liquid which is a solvent for the polymer of (A); and (C) a stabilizer mixture comprising (i) at least one organophosphite compound, at least one hindered phenol, or at least one organotin compound, and (ii) at least one metal-containing carbonate salt. In one embodiment, the metal containing salt is an the aluminum-containing carbonate salt, such as a dihydroxyaluminum carbonate salt.

(A) Chlorinated Polyvinyl Chloride

In one embodiment, (A) is a vinyl chloride polymer or copolymers including, for example, polyvinylchloride (PVC) and chlorinated polyvinyl chloride (CPVC). Vinyl chloride polymers and copolymers are well known in the art. Copolymers of vinyl chloride include, for example, copolymers of vinyl chloride with one or more copolymerizable monomers having at least one terminal $CH_2=C<$ group such as other vinyl halides and vinylidene halides; acrylic acid, esters of acrylic acid such as methyl acrylate, ethyl acrylate, etc.; methacrylic acid; esters of methacrylic acid; nitriles such as acrylonitrile, methacrylonitrile, etc.; acrylamides such as methyl acrylamide, etc.; vinyl ethers such as ethyl vinyl ether; vinyl ketones; vinyl acetate; vinyl pyridine; etc. Copolymers of vinyl chloride may contain up to 50%, or up to 20% of the copolymerizable monomers.

The chlorinated polyvinyl chlorides (CPVC) useful in the compositions of this invention include chlorinated polyvinyl chloride (also referred to sometimes as post-chlorinated PVC) homopolymers and copolymers. CPVC resins useful in this invention may be prepared by chlorination of any of the polyvinyl chloride homopolymers or copolymers discussed above by procedures known to those skilled in the art. CPVC resins available commercially, are generally available as powders, and may contain from about 57% to about 75% by weight of chlorine. CPVC is often the resin of choice where its high heat deflection resistance is desirable such as in hot water piping systems. CPVC resins useful as the water-insoluble resin in the composition of the invention are available commercially from, for example, Noveon (formerly B. F. Goodrich) under the trade designation Temprite 674X571. Chlorinate polyvinyl chlorides are available commercially from Noveon under the trade names Blazemaster®, Flowguard Gold® and Corzan®. Chlorinated polyvinyl chlorides are available from ATOFINA under the tradename Lucalor®.

The compositions of the present invention comprise at least one chlorinated polyvinyl chloride or a mixture of at least one chlorinated polyvinyl chloride and at least one polyvinyl chloride. When (A) is a mixture then the mixture contains 1%, or at least about 10% or at least about 30%, at least about 50% by weight chlorinated polyvinyl-chloride. In one embodiment, the inherent viscosity of the PVC polymers and copolymers may range from about 0.30 to 1.5, or from about 0.30 to 0.95. PVC homopolymers and copolymers are available from a number of commercial sources. For example, a PVC homopolymer resin is available for Occidental Chemical Corporation under the designation OXY 190 or Geon such as Geon 110X334. Copolymers are available from Occidental Chemical Corporation under the designation OXY 1415 (16% bound vinyl acetate, inherent viscosity 0.37, and bulk density 0.66 g/cc) and OXY 1515 (13.8% bound vinyl acetate, inherent viscosity 0.47, and bulk density of 0.61).

In one embodiment, the only polymers present are polyvinl chloride, chlorinated polyvinyl chloride or mixtures thereof. The balance of the polymer composition may be those polymers which are generally used in the adhesive compositions such as epoxies, phenolics, phenol-aldehydes, urea-aldehydes, polyesters, polycarbonates, polyacrylates, polyacrylamides, polyamides, furans, polyvinyl acetates, polyvinylidene fluoride (PVDG), ABS, styrene polymers, terpolymers of acrylonitrile, butadiene and alpha-methyl styrene, terpolymer of methyl or ethyl acrylate, butadiene and styrene, terpolymers of acrylic esters, styrene and acrylonitrile (ASA), polymers of styrene and maleic anhydride (SMA), styrene-acrylonitrile polymers (SAN), cellulose acetate, cellulose acetate butyrate, cellulose propionate, cellulose nitrate, polysulfonates, polysulfides, polyphenylene oxides (PPO), polyetheramides, etc. In one embodiment, (A) is only chlorinated polyvinyl chloride.

In one embodiment, the other polymers may be present in a combination with the polyvinyl chloride or chlorinated polyvinyl chloride. In this embodiment, the polyvinyl chloride, chlorinated polyvinyl chloride or mixtures thereof are present in a major amount, or in amounts greater than 70%, or in amounts greater than 80%, or in amounts greater than 90% by weight of the polymers present in the composition.

When the compositions are to be used as a solvent cement, the polymers which are included with the polyvinyl chloride or chlorinated polyvinyl chloride include PVDF, ABS, polycarbonate, polystyrene, polyacrylates, cellulose acetate, polyacrylamide, polyamide, etc. The polymer or polymer mixture dissolved in the solvent to form the cement of the invention may be freshly prepared polymer, and in some instances may be polymer regrind. Generally, the polymer or polymers in a cement are identical or at least chemically similar to the polymer surface(s) to be cemented.

The compositions of the present invention generally will contain at least about 1%, or at least about 10%, or at least about 14%, or at least about 15%, or at least about 16%, or at least about 17%, or at least about 18%, or at least about 19%, or at least about 20%, or at least about 25% up to about 40% of (A). More often, the composition contains (A) in an amount from about 14% to about 30% or from about 16% to about 25% or from about 18% to about 23%, or about 20% by weight of the composition. In the specification and appended claims, the range and ratio limits may be combined.

(B) Volatile Organic Liquid Solvent

The volatile organic liquid or liquid mixture used as a solvent may be any liquid or liquids which will dissolve the water-insoluble polymers contained in the adhesive compositions. In one embodiment, the compositions are to be used as adhesives such as solvent cements, and the solvent which also is a solvent for the plastic surface or surfaces which are to be welded or bonded together by the adhesive compositions. In addition, the organic liquids must be volatile, that is, the solvent(s) must be capable of vaporizing under a wide variety of application temperature conditions. In one embodiment, a volatile solvent is one which is capable of vaporizing at ambient or at temperatures slightly above ambient temperatures. The solvents should also be selected after consideration of the toxicity effects and biodegradability of the solvents.

The compositions of the present invention contain from about 30%, or from about 40%, or from a major amount of at least one volatile organic liquid. In one embodiment, the compositions of the present invention contain from about 65% up to about 85%, or from about 70% to about 80% or from about 73% to about 78% or about 75% by weight of at least one volatile organic liquid which is a solvent for the (A) contained in the composition. In one embodiment, the composition contains about 80% by weight of the at least one volatile organic solvent. In another embodiment, (B) is present in an amount from about 30% to about 90%, or from about 40% to about 80%, or from about 45% to about 70% by weight.

Among the solvents which may be included in the compositions of the invention and which have been commonly used alone or in combination for such adhesive compositions are lower (e.g., $C_{1-8}$) alcohols such as methanol, ethanol and isopropanol; ketones such as acetone, methyl ethyl ketone (MEK), methyl isobutyl ketone, isophorone and cyclohexanone (CYH); esters such as methyl acetate, ethyl acetate, ethyl formate, ethyl propionate, and butyl acetate; ethers such as methyl Cellosolve and dioxane; and other liquids such as tetrahydrofuran (THF), N-methyl pyrollidone and dimethylformamide (DMF). As noted earlier the choice of solvent depends upon the type of water-insoluble polymer (A) and the intended use of the composition. For example, if the composition is to be used as a solvent cement for cementing two plastics surfaces together, the solvent or at least one solvent in a mixture should be capable of dissolving or softening the surface of the plastic.

While halogenated solvents, such as such as methylene chloride, ethylene dichloride, trichloroethylene may be used, for environmental reasons their use is highly discouraged by, inter alia, many governmental agencies, and is therefore not recommended. Similarly, while DMF may be used, for health and environmental reasons, and particularly in view of its carcinogenic potential in humans, its use is highly discouraged and is not recommended.

In one embodiment, when the compositions of the invention are to be used as solvent cements having low VOC, the solvents include tetrahydrofuran, methyl ethyl ketone, acetone, cyclohexanone, and mixtures thereof. Particularly useful solvents in the compositions of the present invention when the water-insoluble polymer (A) is PVC, mixtures of tetrahydrofuran (THF) and cyclohexanone and a mixture of THF, CYH, MEK and acetone. When the water-insoluble polymer (A) is CPVC, THF or mixtures of THF with one or more of CYH, MEK and acetone are useful solvents.

In one embodiment, when the polymer (A) is PVC or CPVC, the solvent (B) includes methyl ethyl ketone, acetone, tetrahydrofuran, cyclohexanone or mixtures of two or more thereof. In one embodiment, the polymer (A) is a chlorinated polyvinyl chloride polymer and the solvent (B) includes tetrahydrofuran, cyclohexanone and methyl ethyl ketone. In one embodiment, the polymer (A) is CPVC and the solvent (B) includes THF in an amount from 0 to about 80%, or from about 20% to about 70%, or from about 30% to 65%, or from about 30% to about 50% by weight of the solvent, CYH in an amount from 0 to about 50%, or from 1% to about 40%, or from about 30% to about 50% by weight of the solvent and ME in an amount from about 0 to about 50%, or from 20% to about 40% by weight of the solvent. In one embodiment, the composition includes the solvent (B) THF in an amount of about 40% by weight of the solvent, CYH in an amount of about 40% by weight of the solvent and MEK in an amount of about 20% by weight of the solvent.

In one embodiment, THF is present alone or in combination with one of CYH or MEK. In this embodiment, THF is present in a major amount (greater than 50%), or in an amount greater than about 60%, or greater than about 65%, or greater than about 70% by weight. Either the CYH, MEK or their combination is present in amount to make up the balance of the solvent, for instance from about 0% to 50%, or from about 2% to about 20%, or from about 3% to about 10% by weight.

(C) Stabilizers

The compositions of the present invention further comprise (C) a stabilizer comprising (i) at least one organophosphite compound, at least one hindered phenol, at least one of an organotin compound or mixtures thereof, and (ii) at least one metal-containing carbonate salt. Each component of the stabilizer, e.g., (i) and (ii) are independently present in an amount from about 0.01% up to about 10%, or from about 0.5% to about 7.5%, or about 2% to about 5% by weight based on the total weight of the polymer present in the composition. The stabilizer reduces and/or prevents degradation of the polymer in the solvent cement.

The stabilizer comprises (i) at least one organophosphite compound at least one hindered phenol, at least one organotin compound or mixtures thereof, and (ii) a metal-containing carbonate salt. The present inventor has discovered that when used together in a solvent cement, these stabilizer compounds provide improved stability to the PVC, CPVC or mixed product formed from the composition.

(i) Organophosphite

In one embodiment (C)(i) is at leat one organophosphite. Suitable organophosphite compound may be selected from triaryl phosphites, alkyl diaryl phosphites, dialkyl aryl phosphites, triaryl phosphite, trialkyl phosphites, tris (alkylaryl)phosphites, tris(arylalkyl) phosphites, dialkyl pentaerythritol diphosphites, diaryl pentaerythritol diphosphites, alkyl aryl pentaerythritol diphosphites, dialkyl phosphites, diaryl phosphites, alkyl phosphites, aryl phosphites, their metal salts, such as alkali metal, alkaline earth metal, zinc or aluminum salts. Mixtures of the phosphites and/or their metal salts may be used. The acid phosphites, for example, diphenyl phosphite, di(nonyl phenyl) phosphite and di(isooctyl) phosphite, can be included in the composition in the form of their salts.

The organophosphites which may be used are generally known compounds and include the following di and tri phosphite compounds: triphenyl phosphite, diphenyl alkyl phosphites, phenyl dialkyl phosphites, diphenyldecyl phosphite, didecylphenyl phosphite, diphenyloctyl phosphite, diphenyl phosphite, phenyl-decylphosphite, tricesyl phosphite, cresyldiotcyl phosphite, tris(nonylphenyl) phosphite, trioctyl phosphite, phenyl neopentyl phosphite, nonylphenyldidecylphosphite, (2,4-di-tert-butylphenyl) didodecylphosphite or (2,6-di-tert-butylphenyl) didodecylphosphite and the like.

In one embodiment, the organophosphite is selected from one or more of tris(iso-octyl phosphite, tris(isodecyl) phosphite, tris(iso-tridecyl) phosphite and tris(dipropylene glycol) phosphite, tris (nonylphenyl) phosphite, dioctylphenyl phosphite, diphenyl isodecyl phosphite, diphenyl isooctyl phosphite, phenyl di(isodecyl) phosphite, octylphenyl bis(iso-octyl) phosphite, Diphenyl isooctyl phosphite, phenyldecylphosphite, cresyldioctyl phosphite, and phenyl neopentyl phosphite.

In one embodiment, the organophosphite is selected from one or more of trilauryl phosphite, trioctadecyl phosphite, distearyl pentaerythritol diphosphite, tris(2,4-di-tert-butylphenyl) phosphite, diisodecyl pentaerythritol diphosphite, bis(2,4-di-tert-butylphenyl) pentaerythritol diphosphite, bis-(2,6-di-tert-butyl-4-methylphenyl) pentaerythritol diphosphite, bisiodecyloxypentaerythritol diphosphite, distearyl pentaerythritol diphosphite, bis(2,4-di-tert-butyl-6-methylphenyl) pentaerythritol diphosphite, bis(2,4,6-tri-tert-butylphenyl) pentaerythritol diphosphite, tristearyl sorbitol triphosphite, bis(2,4-di-tert-butyl-6-methylphenyl) methyl phosphite, bis(2,4-di-tert-butyl-6-methylphenyl) ethyl phosphite. Particularly suitable are trioctyl, tridecyl, tridodecyl, tritetradecyl, tristearyl, trioleyl, or tricyclohexyl phosphite.

In one embodiment, the phosphite is selected from the aryl dialkyl and alkyl diaryl phosphites, examples being phenyl didecyl, 2,4-di-tert-butylphenyl didodecyl phosphite, 2,6-di-tert-butylphenyl didodecyl phosphite and the dialkyl and diaryl pentaerythritol diphosphites, such as distearyl pentaerythritol diphosphite.

In the foregoing, alkyl substituents are defined as $C_1-C_{20}$ (or $C_{1-12}$) branched or straight-chain alkyl groups.

In one embodiment, the phosphite is other than a diphosphite linked by a cyclohexyl-, bicyclo- or ether-containing linking group.

Suitable organophosphites include tertiary organo phosphites such as MARK C® manufactured by Witco Corporation, and THERMCHECK® 904 manufactured by Ferro Corporation.

Hindered Phenol

In one embodiment, (C) (i) is at least one hindered phenol. The hindered phenol can be a hindered mono or polyphenol. The hindered phenols are known to those in the art. Hindered phenolic stabilizers are described in Dexter et al., U.S. Pat. No. 3,285,855 and O'Neill, U.S. Pat. No. 3,442,806. U.S. Pat. No. 3,304,283; U.S. Pat. No. 3,432,578; U.S. Pat. Nos. 3,567,664 and 3,637,865; U.S. Pat. No. 4,007,230; U.S. Pat. No. 3,655,559; U.S. Pat. No. 3,979,180; U.S. Pat. No. 4,341,677; U.S. Pat. No. 4,341,677; U.S. Pat. No. 4,420,579; and U.S. Pat. No. 4,440,671 also describe hindered phenols. These patents are incorporated by reference for their disclosure of hindered phenols.

Examples of are the simple monophenols and bisphenols as: 2,4-dimethyl-6-octyl phenol; 2,6-di-tert-butyl-4-methyl phenol (i.e., butylated hydroxy toluene); 2,6-ditertiarybutyl-4-ethyl phenol; 2,6-ditertiarybutyl-4-n-butyl phenol; 2,2'-methylene bis (4-methyl-6-tertiarybutyl phenol); 2,2'-methylene bis (4-ethyl-6-tertiarylbutyl-phenol); 2,4-dimethyl-6-tertiarylbutyl phenol; 4-hydroxymethyl-2,6-ditertiarybutyl phenol; n-octadecyl-beta(3,5-dditertiarybutyl-4-hydroxyphenyl)propionate; 2,6-dioctadecyl-4-methyl phenol; 2,4,6-trimethyl phenol; 2,4,6-triisopropyl phenol; 2,4,6-tri-tert-butyl phenol; 2-tert-butyl-4,6-dimethyl phenol; 2,6-methyl-4-didodecyl phenol; tris (3,5-di-t-butyl-4-hydroxy isocyanurate, tris (4-methyl-4-hydroxy-5-t-butylphenyl)butane.

Examples of commercially available hindered phenolic compounds are n-octadecyl-3-(3,5-di-butyl-4-hydroxyphenyl) propionate (Irganox 1076), 5,5'-bis (5-t-butyl-2,3-dimethyl-4-hydroxybenzyl) diethioterephthalate (Antioxidant 1729), 4-hydroxymethyl-2,6-di-t-butyl phenol (Antioxidant 754), and 2,6-di-t-butyl-alpha-dimethylamino-p-cresol (Antioxidant 703). Irganox 1076 is a trademark of Geigy Chemical Corporation. Antioxidant 703 and Antioxidant 754 are trademarks of Ethyl Corporation, Antioxidant 1729 is a trademark of American Cyanamid Corporation.

Particularly useful hindered phenolics are those derived from pentaerythritol. Examples of hindered phenol compounds include: tetrakis-[methylene 3-(3,5-di-tert-butyl-4-hydroxyphenyl propionate]methane, and tetrakis-[methylene 3-(3-tert-butyl-5-methyl-4-hydroxyphenyl) propionate]methane. Tetrakis-[methylene 3-(3,5-di-tert-butyl)-4-hydroxyphenyl) propionate]methane is especially preferred for use in the invention. A commercial form of the compound is sold by Geigy Chemical Corporation under the trademark Irganox 1010. Other similar phenolic compounds without groups capable of participating in the polycondensation reaction were not found effective. Another useful hindered phenol is Anox pp-18 (oxtyadecyl-3-(3',5'-di-tert-butyl-4'-hydroxyphenyl)propionate) from Great Lakes Chemical.

Organotin Stabilizer Compounds

In another embodiment, (C)(i) is at least one organotin compound. Suitable organotin compounds for use in the stabilizer of the present invention may be selected from organotin mercaptides, e.g., alkyl tin trimercaptides, dialkyl dimercaptides, organotin mercaptides, organotin sulfides, organotin mercaptide-sulfides, organotin mercaptocarboxylates and organotin carboxylates.

Suitable examples of the organotin stabilizer compounds may for convenience be separated into three general groups, (1) organotin mercaptides; (2) organotin sulfides; and (3) organotin thiocarboxylates and carboxylates. Exemplary organotin compounds are disclosed in U.S. Pat. No. 4,743,640, which is incorporated herein by reference for its teachings of organotin compounds. Further details on each group follow:

In one embodiment, the organotin mercaptides have one of formulae 1a and 1b;

(1a)

-continued

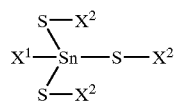
(1b)

wherein each $X^1$ is independently $C_6$–$C_{20}$ alkoxycarbonylalkyl or $C_1$–$C_{20}$ alkyl, in one embodiment $C_1$–$C_{12}$ alkyl and, in other embodiments, methyl, n-butyl, n-octyl or n-dodecyl, and each $X^2$ is independently $C_6$–$C_{20}$ alkoxycarbonylalkyl, $C_6$–$C_{20}$ alkylcarbonyloxyalkyl or $C_4$–$C_{18}$ alkyl, in one embodiment isooctyl.

In one embodiment, when $X^1$ and $X^2$ in formulae 1a or 1b are $C_6$–$C_{20}$ alkoxycarbonylalkyl, for example, each of the substituents $X^1$ and $X^2$ independently is ($C_4$–$C_{18}$ alkyl)—O—CO—CH$_2$CH$_2$— or ($C_4$–$C_{18}$ alkyl)-O—CO—CH$_2$—, e.g., hexoxycarbonylethyl, isooctoxycarbonylmethyl, isooctoxycarbonylethyl or dodecyloxycarbonylethyl.

In another embodiment, when $X^1$ and $X^2$ in formulae 1a or 1b are $C_6$–$C_{20}$ alkylcarbonyloxyalkyl, for example, each of the substituents $X^1$ and $X^2$ independently is ($C_4$–$C_{17}$ alkyl)—CO—O—C$_2$CH$_2$—, or ($C_4$–$C_{17}$ alkyl)—CO—O—CH$_2$—, e.g., isooctylcarbonyloxyethyl, isooctylcarbonyloxymethyl, stearylethyl or stearylmethyl.

In one embodiment, the organotin mercaptides are compounds of formula 1c:

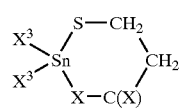
(1c)

wherein each $X^3$ is independently $C_1$–$C_{20}$ alkyl and each X═O or S independently. In one embodiment, both $X^3$ are $C_{18}$, e.g., stearyl.

Exemplary organotin compounds include: methyltin-tris (alkylthioglycolate), n-butyltin-tris(arylthioglycolate), n-butoxycarbonylethyltin-tris(alkylthioglycolate), dimethyltin-bis(alkylthioglycoate), di-n-butyltin-bis (alkylthioglycolate), bis(n-butyoxycarbonylethyl)tin-bis (alkylthioglycolate), methyltin-tris(alkylthiopropionate), n-butyltin-tris(alkylthiopropionate), n-butoxycarbonylethyltin-tris(alkylthiopropionate), dimethyltinbis(alkylthiopropionate), di-n-butyltin-bis (alkythiopropionate) and bis(n-butoxycarbonylethyl)tin-bis (alkylthiopropionate), where alkyl is for example isooctyl (=2-ethyl-n-hexyl), dodecyl, tridecyl or tetradecyl. In one embodiment, the organotin compound is one or more of di-n-butyltin-bis(isooctylthioglycolate). n-butyltin-tris(n-tetradecylthioglycolate), di-n-octylin-bis (isooctylthioglycolate) and n-octyltin-tris (isooctylthioglycolate).

Examples of the organotin mercaptides include diorganotin mercaptides such as dibutyltin bis (laurylmercaptide), dimethyltin bis (stearylmercaptide), dioctyltin bis (mercaptoethyl-tall oil fatty acid ester), dioctyltin bis (2-mercaptoethyl caprylate), dibutyltin bis (mercaptoethyl-tall oil fatty acid ester), dimethyltin bis (mercaptoethyl stearate), diotyltin bis (isooctylthioglycolate),diotyltin bis (2-ethylhexylthioglycolate), dioctyltin bis (dodecylthioglycolate), dioctyltin bis (tetradecylthioglycolate), dioctyltin bis (hexadecylthioglycolate), dioctyltin bis (octadecylthioglycolate), diotyltin bis ($C_{12-16}$ mixed alkylthioglycolate), dibutyltin bis (isooctylthioglycolate), dimethyltin bis (isooctylmercaptopropionate), bis (2-mercaptocarbonylethyl)tin bis (isooctylthioglycolate), and bis (2-butoxycarbonylethyl)tin bis (butylthioglycolate).

In another embodiment, the organotin mercaptide is one or more of monobutyltin tris (laurylmercaptide), monobutylmonochlorotin bis (laurylmercaptide), monooctyltin tris (2-mercaptoethyl caprylate), monobutyltin tris (mercaptoethyl-tall oil fatty acid ester), monomethylthin tris (mercaptoethyl-tall oil fatty acid ester) monomethyltin tris (mercaptoethyl laurate), monomethyltin tris (mercaptoethyl stearate), monomethyltin tris (mercaptoethyl oleate), monooctyltin tris (isooctylthioglycolate), monooctyltin tris (2-ethylhexyl thioglycolate), monooctyltin tris (dodecylthioglycolate), monooctyltin tris (tetradecylthioglycolate), monooctyltin tris (hexadecylthioglycolate), monooctyltin tris ($C_{12-16}$ mixed alkylthioglycolate), monooctyltin tris (octadecylthioglycolate), monobutyltin tris (isooctylthioglycolate), monobutyltin tris (isooctylmercaptopropionate), monomethyltin tris (isooctylthioglycolate), monomethyltin tris (tetradecylthioglycolate), 2-methoxycarbonylthyltin tris (isooctylthioglycolate), and 2-butoxycarbonylethyltin tris (2-ethylhexylthioglycolate).

In one embodiment, the organotin compound is one or more selected from, e.g. di-($C_1$–$C_{18}$ alkyl) tin sulfides and ($C_1$–$C_{18}$ alkyl) tin thiostannonic acids, and in one embodiment, a cyclic di-n-butyl tin sulfide of formula 2a and, in one embodiment, the adamantane-like n-butylthiostannonic acid of formula 2b.

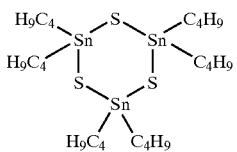
(2a)

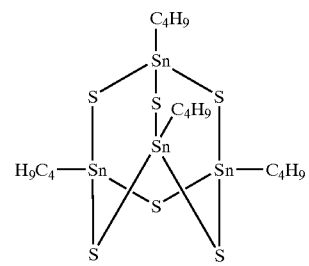
(2b)

In one embodiment, the organotin sulfide is one or more selected from methylthiostannoic acid, butylthiostannoic acid, octylthiostannoic acid, dimethyltin sulfide, dibutyltin sulfide, dioctyltin sulfide, dicyclohexyltin sulfide, monobutyltin sulfide oxide, 2-methoxycarbonylethyltin sulfide, 2-ethoxycarbonyltin sulfide, 2-butoxycarbonylethyltin sulfide, 2-isopropoxycarbonylethyltin sulfide, bis(2-methoxycarbonylethyl)tin sulfide and bis(2-propoxycarbonylethyl)tin sulfide.

Examples of suitable organotin sulfides include, for example, one or more of bis [monobutyl-di (isooctoxycarbonylmethylenethio)tin]sulfide, bis [dibutylmono(isooctoxycarbonylmethylenethio)tin]sulfide, bis [bis (2-methoxycarbonylethyl)tin isooctylthioglycolate] sulfide, bis (methyltin diisooctylthioglycolate) disulfide, bis (methyl/dimethyltin mono/diisooctylthioglycolate) disulfide, bis (methyltin diisooctylthioglycolate) trisulfide, bis (butyltin diisooctylthioglycolate) trisulfide, bis [methyltin di(2-methylcaptoethyl caprylate) sulfide, and bis [methyltin di(2-mercaptoethyl caprylate)]disulfide.

Examples of suitable organotin mercaptides include, for example, one or more compounds of the general structure $R_n\text{Sn}(SA)_{n-4}$, wherein R is, inter alia, a methyl, butyl, octyl, lauryl or carbobutoxyethyl group, n is 1 to 2, and A is typically a decyl, dodecyl or carboalkoxymethyl or carboalkyloxyethyl radical, and the alkoxy moiety is a straight-chain or branched $C_6$–$C_{18}$ alkoxy or $C_5$–$C_8$ cycloalkoxy radical. Illustrative examples of such tin compounds are dimethyltin bis-carboisooctyloxymethyl mercaptide, dibutyltin dilauryl mercaptide, dioctyltin bis-carbo-2-ethylhexoxymethyl mercaptide, dimethyltin bismercaptoethyl stearate, octyltin tris-carbo-2-ethylhexoxymethyl mercaptide, monomethyltin mercaptoethyl oleate sulfide and bis-dimethyltin mercaptoethyl stearate sulfide.

Commercially available products include Morton TM-181 which is a blend of dialkyltin bis(iso-thioglycolates) with monoalkyltin tris(iso-thioglycolates) which are generally referred to as "tin mercaptides" and Morton TM-694, which is a blend of dialkyltin bis(2-mercaptoethyl oleates), referred to as "reverse ester tins." Ackros T-878M is a dialkyltin carboxylate ester.

The organotin stabilizer compound may be an organtin thiocarboxylate or an organotin carboxylate, e.g., alkyl tin trithioesters, dialkyl tin dithioesters, alkyl tin trithiocarboxylates, dialkyl tin dithiocarboxylates, alkyl tin tricarboxylates, and dialkyl tin dicarboxylates. Specific examples follow.

In one embodiment, the organotin thiocarboxylate or carboxylate is one having the following formula (3):

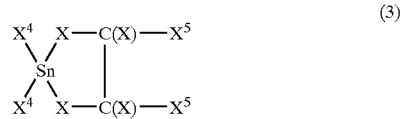

(3)

wherein X=O or S, $X^4$ and $X^5$ may be $C_1$–$C_{20}$ alkyl and both $X^5$ taken together may be —($C_1$–$C_{20}$ alkyl)—, to form a Sn-containing ring. In one embodiment, $X^4$ and $X^5$ of formula (3) are $C_1$–$C_{10}$ alkyl. In one embodiment, in formula (3), $X^4$ is n-butyl or n-octyl and $X^5$ is methyl, ethyl, propyl or butyl.

Examples of the organotin mercaptocarboxylates include dibutyltin-β-mercaptopropionate, dioctyltin-β-mercaptopropionate, dibutyltin mercaptoacetate, bis(2-methoxycarbonylethyl)tin thioglycolate, and bis(2-methoxycarbonylethyl)tin mercatopropionate.

Examples of the organotin carboxylates include aliphatic monovalent carboxylates such as mono or dimethyltin, mono or dibutyltin, mono or dioctyltin, and octoate, laurate, myrystate, palmitate, stearate or isostearate of mono or bis(butoxycarbonylethyltin; maleates such as maleate polymer, butyl maleate, benzyl maleate, oleyl maleate and stearyl maleate; and mixed salt or basic salts thereof. In one embodiment, the organotin compound of the stabilizer is di-n-butyltin-bis(methylmaleate).

Metal Containing Carbonate Salts

In another embodiment, (C)(ii) is at least one metal containing carbonate. The metal carbonate salts include carbonate, hydroxy carbonate and bicarbonate salts of alkali metal, alkaline earth metals and aluminum. The salts may be double or partial salts. Mixtures of metal salts may be used. Particularly useful metals include sodium, magnesium, calcium and aluminum. Mixtures of metal carbonates may be used.

In one embodiment, the stabilizer is an aluminum-containing carbonate salt. In one embodiment, the aluminum-containing carbonate salt is a dihydroxyaluminum carbonate salt. In another embodiment, the aluminum-containing carbonate salt comprises other suitable substituents, such as sulfhydryl (—SH), organosulfur (—SR, where R=$C_1$–$C_{18}$alkyl), amine (—$NH_2$) or substituted amine (—$NR_1R_2$, where $R_1$ and $R_2$ are independently H or $C_1$–$C_{18}$ alkyl, with at least one of $R_1$ or $R_2$ alkyl).

Suitable aluminum-containing carbonate salts include, in one embodiment, any alkali metal or alkaline earth metal as the counterion for the aluminum-containing carbonate. In one embodiment, the counterion is sodium, or potassium, or rubidium or cesium, and in another embodiment, berylium, magnesium or calcium. In another embodiment, other metal ions may be used, such as the transition metals. Suitable transition metal ions include, for example, Sc, Ti, V, Fe, Co, Ni, Cu and Zn. In one embodiment, the metal ion is tin(IV). When a multivalent counterion is used, the metal ion is bonded to a number of aluminum carbonate moieties to balance the valence of the metal ion used. Thus, for example, when the counterion is calcium, the salt may be calcium bis(dihydroxyaluminum carbonate), $Ca(Al(OH)_2CO_3)_2$. In one embodiment, the counterion is sodium, and the salt is referred to as DASC (dihydroxyaluminum sodium carbonate). DASC is available from Chattem Chemical, Chattanooga, Tenn. In one embodiment, the carbonate used is FDA approved for use in food grade resins or products handling or contacting food, since the products made with the composition of the present invention may be used for, e.g., drinking water pipes.

(D) Solid Particulate Inorganic Filler

The compositions may further include at least one solid particulate inorganic filler. The amount of filler is determined by the end use of the composition. For example, adhesive compositions may contain a small amount whereas sealants will generally contain larger amounts of the filler. Thus, the adhesive compositions of the present invention may be characterized as containing from about 0.1% to about 5%, or from about 0.3% to about 4%, or about 0.5% to about 3% or about 0.75% to about 1.5% by weight of the polymer present in the adhesive composition. The particulate inorganic fillers are inert and are generally included in the compositions of the present invention to improve working viscosity and structural strength and to reduce costs. In embodiments in which hollow microspheres are included, the filler reduces the tendency of the hollow microspheres to separate and float to the surface of the composition i.e., the filler helps to maintain the microspheres in suspension. The tendency of the microspheres to separate from a homogeneous mixture is referred to in the industry as "bead float-out".

The solid particulate inorganic filler incorporated into the adhesive compositions of the present invention preferably is a fine powder having an average particle size of less than about 50 microns and a density of less than about 4 g/cc. The inorganic filler which can be utilized in the adhesive compositions of the present invention may include one or more of amorphous silica, silica flour, ground quartz, talc, magnesium silicate, calcium carbonate, clay, whiting, shell flour, wood flour, alumina, antimony trioxide, asbestos powder, barium sulfate, calcined clays. China clays, magnesium oxide, mica powder, precipitated silica, silica gel, etc. In one embodiment, the filler is fumed silica available commercially from Cabot Corporation under the trade designation CAB-O-SIL and from the Degussa Corporation under the trade designation Aerosil. For example, CAB-O-SIL grade PTG is a fumed silica available from the Cabot Corporation and having a surface area of 200±25 $m^2$/g and a nominal particle diameter of 0.014 microns.

(E) Inorganic or Synthetic Resinous Hollow Microspheres

In addition to the foregoing components, the compositions may further comprise inorganic or synthetic resinous hollow microspheres. The microspheres incorporated into the compositions of the present invention generally have a density of less than about 0.5 g/cc and a mean diameter of less than about 200 microns, more often less than about 150 microns. The compositions of the invention may contain from about 1% to about 30% by weight of the composition, or from about 3% to about 20% by weight of the composition, or from about 5% to about 15% by weight of the composition, of the hollow microspheres. The hollow microspheres act as a filler and decrease the density of the adhesive composition.

In one embodiment, the inorganic hollow microspheres used in the present invention are glass microspheres or microbubbles such as those described in U.S. Pat. No. 3,365,315. The walls of these microspheres are made by expanding solid glass particles at temperatures above 1000° C. to form tiny hollow spheroids having an apparent density in the range of about 0.14 to about 0.38 g/cc, a wall thickness of about 0.5 to 2.0 microns, and an average particle size of about 60 microns. Other suitable glassy or inorganic microspheres of synthetic fused water-insoluble alkali metalsilicate-based glass are described in U.S. Pat. No. 3,230,184, and microspheres made of sodium silicate which are useful in the present invention are described in U.S. Pat. No. 3,030,215. Microspheres prepared from heat expanded natural minerals such as perlite, volcanic ash, fly ash, vermiculite, etc., also may be used.

Hollow glass microspheres (also referred to as glass bubbles) which are useful in the present invention are available commercially from The 3M Company under the trade designation Scotchlike® Glass Bubbles. The chemical properties of these glass bubbles are reported to resemble those of a soda-lime-borosilicate glass. Glass bubble designation C15/250 has a nominal average particle density (ASTM D-2840) of 0.15 g/cc, a range of 0.12 to 0.18 g/cc and a calculated bulk density of 0.07 to 0.12 g/cc. Bubble type E22/400 has a nominal average particle density of 0.22 g/cc and a range of 0.19 to 0.25 g/cc. The bulk density of the E22/400 is in the range of 0.09 to 0.17. Other glass bubbles available from 3M include K-2 glass bubbles, S60/10,000 having a nominal average particle density of 0.60, and B23/500 having a nominal average particle density of 0.23. Inorganic hollow microspheres also are available from other commercial sources such as the Philadelphia Quartz Co., Valley Forge, Pa. under the designation "Q-CEL" Inorganic microspheres; Pittsburgh Corning Corp., Pittsburgh, Pa.; Emerson & Cuming Inc., Canton, Mass.; etc.

Organic resinous microspheres may also be utilized in the compositions of the present invention provided they are relatively inert and not soluble in the solvent (B). Thermoset resins generally have such properties. Examples include microspheres of epoxy resins; urea-formaldehyde having diameters ranging from 2–60 microns and a density of about 0.23; phenolic resin having a density of 0.2–0.35 g/cc and diameters ranging from about 2–50 microns (available from Union Carbide under the trade designation of phenolic "microballons"); polyvinylidene polymers and copolymers having a density of 0.03 and an average diameter of 25–28 microns (e.g., those commercially available from Dow Chemical Company under the trade designation "Saran" dry expanded resin-bubbles); etc. For a description of these and other organic resin microspheres, see U.S. Pat. No. 2,79,201.

Preparation And Other Characteristics of The Composition

The compositions of the present invention are typically blended to provide the adhesive. In one embodiment the compositions are substantially homogeneous compositions. Mixtures are desirable since non-uniform mixtures will result in non-uniform distribution of the adhesive composition and non-uniform adhesion to substrate surfaces. If desired, small amounts of pigments or colorants such as titanium dioxide, carbon black or a dye or other colorant may be added to the adhesive compositions to serve as a guide for uniform mixing and to provide a method of identifying various adhesive compositions. In one embodiment, it is desirable to disperse the solid particulate inorganic filler into the polymer prior to addition of the hollow microspheres. For example, good results are obtained when the filler is dispersed into the polymer using a high speed Cowles type impeller.

The adhesive compositions formulated in accordance with the present invention generally have a minimum viscosity of about 500 centipoises (cps), and the viscosity may be as high as 10,000 to 15,000 cps provided that the adhesive compositions can be readily applied to the surfaces to be bonded. In one embodiment, the compositions have a viscosity from about 250 to about 5000, or from about 500 to about 4000, or from about 1000 to about 3000. The molecular weights of the polymers (A) affect the viscosity of the adhesive composition. The use of polymers having lower inherent viscosities permits a higher polymer percentage or loading and thereby lower the amount of solvent required to achieve a given viscosity. Viscosities may range from about 8000 to about 15,000 cps and are readily obtained with the compositions of the present invention, and such viscosities are desirable since the adhesive may be applied to substrates without dripping and with little or no spillage. The adhesive compositions of the invention appear to form a "pseudo skin" which prevents the adhesive compositions from dripping once applied to a substrate.

The compositions of the present invention are easy to apply, cost effective, and cure within a reasonable period of time without the use of heat, pressure, UV light or extraordinary mechanical devices. The bonding or adhesive properties are satisfactory for the intended uses whether in non-pressure drain, waste or vent (DWV) applications or in pressure systems such as in potable water applications. One particular advantage of the adhesive compositions of the present invention is that the compositions are a one-component system and are "plumber friendly".

In accordance with the present invention, compositions can be prepared providing heat-stable solvent cements for PVC and CPVC and having desirable VOC limits, through the use of stabilizes comprising an organophosphite compound and at least one of an organotin compound or an aluminum-containing carbonate salt such as those described above. The use of these stabilizers is desirable because they provided increased protection against both loss of chlorine and the untoward effects of the free chlorine resulting from thermal or radiation-induced effects on the PVC or CPVC in the bonding compositions. These stabilizers are chemically stable, non-hazardous (non-toxic) and compatible with the other ingredients used in the adhesive compositions. In accordance with the present invention, useful compositions for solvent cements for PVC and CPVC can be prepared which may be characterized as stabilized solvent cements.

Thus, the present invention further relates to a method of adhesively bonding or solvent welding a first plastic surface to a second plastic surface, which comprises the steps of (I) providing at least two plastic pieces for bonding;

(II) treating at least one surface of one of the plastic pieces with a composition comprising (A) at least one chlorinated polyvinyl chloride or a mixture of chlorinated polyvinyl chloride and polyvinyl-chloride mixtures thereof; (B) at least one volatile organic liquid which is a solvent for the polymer of (A) and (C) a stabilizer comprising (i) organophosphite compound, at least one hindered phenol, at least one of an organotin compound or mixtures thereof, and (ii) at least one metal-containing carbonate salt; and (III) contacting the treated surface of the plastic piece to the other plastic piece to form a bond.

In one embodiment, the composition applied in step (I) further includes (D) at least one solid particulate inorganic filler.

In one embodiment, the composition applied in step (I) further includes (E) inorganic or synthetic resinous hollow microspheres.

EXAMPLES

The following examples illustrate the compositions of the present invention. Unless otherwise indicated in the following examples and elsewhere in the specification and claims, all parts and percentages are by weight. The amounts are parts by weight.

| Example 1 | A | B |
|---|---|---|
| CPVC (Temprite 674X571) | 1.0 | 10 |
| PVC resin (Geon 110X334) | 6.6 | 6.6 |
| THF | 42.7 | 42.7 |
| CYH | 11.0 | 11.0 |
| MEK | 1.2 | 1.2 |
| Acetone | 11.5 | 11.5 |
| PTG | 12.0 | 2 |
| Stabilizer | | |
| Dibutyltin bis(laurylmercaptide) | 2.5 | 2.5 |
| Diphenyloctyl phosphite | 2.5 | 2.5 |

| Example 2 | A | B |
|---|---|---|
| (CPVC (Temprite 674X571) | 12 | 6 |
| PVC resin (Geon 110X334) | 6 | 12 |
| THF | 50.0 | 50 |
| CYH | 10.0 | 10 |
| E-22 glass bubbles | 13.0 | 13 |
| PTG | 2.0 | 2 |
| Stabilizer | | |
| 2-ethoxycarbonyltin sulfide | 3.5 | 3.5 |
| Phenyneopentyl phosphite | 3.5 | 3.5 |

| Example 3 | A | B |
|---|---|---|
| CPVC resin (Temprite 674X571) | 16.5 | 16.5 |
| THF | 47.0 | 47.0 |
| CYH | 6.0 | 6.0 |
| MEK | 9.9 | 9.9 |
| Acetone | 6.2 | 2 |
| PTG | 8.7 | 8.7 |
| Orange dye | 0.7 | 0.7 |
| Stabilizer | | |
| Dihydroxyaluminum sodium carbonate | 2.5 | 2.5 |
| Tristearyl phosphite | 2.5 | 2.5 |

| Example 4 | A | B |
|---|---|---|
| CPVC resin (Temprite 674X571) | 20.0 | 20 |
| THF | 56.4 | 56.4 |
| E-22 glass bubbles | 15.0 | — |
| PTG | 1.6 | 1.6 |
| Orange dye | 0.7 | 0.7 |
| Stabilizer | | |
| Dihydroxyaluminum sodium carbonate | 3.5 | 3.5 |
| Cresyldioctyl phosphite | 2.8 | 2.8 |

| Example 5 | A | B |
|---|---|---|
| CPVC resin (Temprite 674X571) | 22.0 | 22.0 |
| THF | 42.5 | 42.5 |
| CYH | 8.5 | 5 |
| MEK | 0.5 | — |
| Acetone | 14.5 | — |
| E-22 glass bubbles | 4.0 | — |
| PTG | 2.5 | — |
| Red dye | 0.5 | 0.5 |
| Stabilizer | | |
| Di-n-butyltin bis(methylmaleate) | 2.0 | 2 |
| Diphenyloctyl phosphite | 3.0 | 3 |

| Example 6 | A | B |
|---|---|---|
| CPVC resin (Temprite 674X571) | 22.0 | 22 |
| THF | 41.0 | 41 |
| CYH | 8.5 | 8.5 |
| MEK | 0.5 | 0.5 |
| Acetone | 14.5 | — |
| E-22 glass bubbles | 4.0 | — |
| PTG | 2.5 | — |
| Orange dye | 0.5 | 0.5 |
| Stabilizer | | |
| Dihydroxyaluminum sodium carbonate | 2.5 | 2.5 |
| Di-n-butyltin bis(methylmaleate) | 1.0 | 1 |
| Diphenyloctyl phosphite | 3.0 | 3 |

| Example 7 | A | B |
|---|---|---|
| CPVC resin (Temprite 674X571) | 16.5 | 16.5 |
| THF | 47.0 | 47.0 |
| CYH | 6.0 | 6.0 |
| MEK | 9.9 | 9.9 |
| Acetone | 6.2 | 2 |
| PTG | 8.7 | 8.7 |
| Orange dye | 0.7 | 0.7 |
| Stabilizer | | |
| Dihydroxyaluminum sodium carbonate | 2.5 | 2.5 |
| Triphenyl phosphite | 2.5 | 2.5 |

| Example 8 | A | B |
|---|---|---|
| CPVC resin (Temprite 677X670) | 20.0 | 20 |
| THF | 56.4 | 56.4 |
| E-22 glass bubbles | 15.0 | — |
| PTG | 1.6 | 1.6 |
| Orange dye | 0.7 | 0.7 |
| Stabilizer | | |
| Dihydroxyaluminum sodium carbonate | 3.5 | 3.5 |
| Cresyldioctyl phosphite | 2.8 | 2.8 |

| Example 9 | A | B |
|---|---|---|
| CPVC resin (Temprite 674X571) | 22.0 | 22.0 |
| THF | 42.5 | 42.5 |
| CYH | 8.5 | 5 |
| MEK | 0.5 | — |
| Acetone | 14.5 | — |
| E-22 glass bubbles | 4.0 | — |
| PTG | 2.5 | — |
| Red dye | 0.5 | 0.5 |
| Stabilizer | | |
| magnesium carbonate | 2.0 | 2 |
| Diphenyloctyl phosphite | 3.0 | 3 |

| Example | | | | | | | |
|---|---|---|---|---|---|---|---|
| CPVC[1] resin | 66 | 12 | 6 | 21 | 18 | 18 | 20 |
| PVC[1] resin | 10 | 6 | 12 | — | — | — | — |
| THF | 54 | 50 | 50 | 50 | 45 | 45 | 50 |
| CYH | — | 10 | 10 | — | — | 8 | 7 |
| MEK | — | — | — | 7 | 17 | — | 6 |

-continued

| | | | | | | | |
|---|---|---|---|---|---|---|---|
| Phosphite[3] | 3 | 3.5 | — | 1 | — | 2.8 | 3.2 |
| Hindered Phenol[4] | — | — | 3 | 2 | 2.5 | — | — |
| Magnesium Carbonate | 3 | 2.5 | — | — | 3.1 | — | — |
| Aluminum Carbonate[5] | — | — | 2.5 | — | — | 3.5 | 3.2 |

[1]Temprite 674X571
[2]Geon 110X334
[3]Distearyl pentaerythritol diphophite
[4]Anox pp-18
[5]Dihydroxy aluminum sodium carbonate The utility of the compositions of the present invention, and in particular, the utility of the adhesive compositions as solvent cements for CPVC pipes and fittings is demonstrated by testing the adhesive composition for hydrostatic quick burst strength tests are conducted per ASTM D-2564 or F-493.

Thus, the solvent cement of the present invention may be applied in substantially the same manner as known solvent cements for PVC and CPVC, and does not require special handling. Of particular benefit in the present invention is that the method does not require pre-cleaning of the parts to be joined.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. A composition comprising:
(A) at least one chlorinated polyvinyl chloride;
(B) at least one volatile organic liquid which is a solvent for the chlorinated polyvinyl chloride; and
(C) a stabilizer comprising (i) at least one organophosphite compound, at and (ii) at least one metal-containing carbonate salt.

2. The composition of claim 1 wherein the solvent (B) comprises a lower alcohol, a ketone, an aldehyde, an ester, an ether, a halogenated solvent, tetrahydrofuran, N-Methyl pyrollidone, dimethyl-formamide or mixture of two or more thereof.

3. The composition of claim 1, wherein the organophosphite compound is an alkyl diaryl phosphite, a dialkyl aryl phosphite, a trialkyl phosphite, an triayl phosphite, a tris (alkylaryl)phosphine, tris(arylalkyl) phosphite, a dialkyl pentaerythritol diphosphite, a diaryl pentaerythritol diphosphite, an alkyl aryl pentaerythritol diphosphite, a dialkyl phosphite, a diaryl phosphite, analkyl phosphite an aryl phosphite, their metal salts or mixtures of two or more of the phosphites or their metal salts.

4. The composition of claim 1 wherein the carbonate salt is a sodium, magnesium or aluminum carbonate salt.

5. The composition of claim 1 wherein the salt comprises an aluminum containing salt.

6. A composition comprising (A) at least one chlorinated polyvinyl chloride or a mixture of at least one chlorinated polyvinyl chloride and at least one polyvinyl chloride, (B) at least one volatile organic liquid which is a solvent for chlorinated polyvinyl chloride, and (C) a stabilizer comprising (i) at least one organophosphite compound, and (ii) at least one metal-containing carbonate salt.

7. The composition of claim 6 wherein the organophosphite compound is an alkyl diaryl phosphite, a dialkyl aryl phosphite, a trialkyl phosphite, a triaryl phosphite, a tris (alklylaryl)phosphine, tris(arylalkyl) phosphite, a dialkyl pentaerythritol diphosphite, a diaryl pentaerythritol diphosphite, an alkyl aryl pentaerythritol diphosphite, a dialkyl phosphite, a diaryl phosphite, an alkyl phosphite an aryl phosphite, their metal salts or mixtures of two or more of the phosphites or their metal salts.

8. The composition of claim 6 wherein the solvent (B) comprises a lower alcohol, a ketone, an aldehyde, an ester, an ether, a halogenated solvent, tetrahydrofuran, N-methyl pyrollidone, dimethyl-formamide or mixtures of two or more thereof.

9. The composition of claim 6 wherein the carbonate salt is a sodium, magnesium or aluminum carbonate salt.

10. The composition of claim 6 wherein the salt comprises an aluminum containing salt.

* * * * *